United States Patent Office 3,565,957
Patented Feb. 23, 1971

3,565,957
HYDROGENATION OF NITRILO-
TRIACETONITRILE
Stanley B. Mirviss, Stamford, Conn., and Donald J. Martin, Irvington, and Edward D. Weil, Yonkers, N.Y., assignors to Stauffer Chemical Company, New York, N.Y., a corporation of Delaware
No Drawing. Filed Sept. 20, 1968, Ser. No. 761,290
Int. Cl. C07c 85/12
U.S. Cl. 260—583
5 Claims

ABSTRACT OF THE DISCLOSURE

Tris(2-aminoethyl)amine is produced by reacting nitrilotriacetonitrile with hydrogen in the presence of a relatively large quantity of ammonia and as a catalyst Raney nickel, Raney cobalt or rhodium.

BACKGROUND

The reduction of a nitrile to an amine is well known in the art. Problems arise, however, when di- and polynitriles are to be reduced to primary amines. After the initial attack of hydrogen on a nitrile group to form an imine, the imine can react with a nitrile group on another molecule to form a secondary amine polymer or, if there is a possibility of five or six membered ring formation, it can react with a nitrile group in the same molecule which is at least 4 atoms away to form a heterocyclic secondary amine. The rates of these reactions are much greater than the rate of formation of the primary amine and, therefore, very little, if any, primary amine is produced when a polynitrile is catalytically hydrogenated.

BRIEF DESCRIPTION OF THE INVENTION

It has been discovered that tris(2-aminoethyl)amine can be prepared from nitrilotriacetonitrile by catalytic hydrogenation in the presence of ammonia. The compound prepared in accordance with the present invention has the following structure:

$$N(CH_2CH_2NH_2)_3$$

The compound made by the process of this invention is known and has utility as a chelating and sequestering agent.

DETAILED DESCRIPTION OF THE INVENTION

The process of the present invention comprises reacting nitrilotriacetonitrile with hydrogen in the presence of a catalyst and a large amount of ammonia. Liquid ammonia or a saturated ammonical solution of ammonia and an alcohol can be employed as the solvent. The catalyst used in the present invention is a conventional hydrogenation catalyst chosen from the group consisting of Raney nickel, Raney cobalt and rhodium.

The nitrilotriacetonitrile employed in the process of this invention is well known in the art and has the formula:

$$N(CH_2CN)_3$$

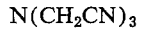

It can be prepared by reacting ammonia and formaldehyde together in stoichiometric portions, and then reacting the hexamethylene tetramine formed, with hydrogen cyanide and additional formaldehyde in the presence of a mineral acid, such as sulfuric acid.

In accordance with the present invention the ammonia can be present as liquid ammonia or as a saturated ammonical solution comprised of ammonia and a lower alkyl alcohol such as methanol. However, the ammonia must be present in relatively large proportion to the nitrile. The ratio of moles of ammonia per mole of nitrilotriacetonitrile being from about 10:1 to about 100:1. The preferred range for the present invention is from about 25:1 to about 75:1.

The reaction of this process is carried out in an autoclave or analogous vessel designed to retain a multiphase system under conditions of elevated temperature and pressure. Hydrogen pressures suitable in the practice of this invention range from 50 to 3000 p.s.i. Selection of the proper pressure is dependent on the catalyst and temperature used. At least 6.0 moles of hydrogen are required per mole of nitrilotriacetonitrile. Excess hydrogen under more forceful pressures increases the yield of the desired tris(2-aminoethyl)amine. The preferred ratio of hydrogen to nitrilotriacetonitrile is in the range of about 8 to about 30 moles of hydrogen per mole of nitrilotriacetonitrile.

The catalyst which is employed in the present invention is a conventional hydrogenation catalyst chosen from the group consisting of Raney nickel, Raney cobalt, and rhodium. Raney nickel, in its various grades, can be used in this process. The more reactive varieties of Raney nickel, namely W6 and W7, are preferred. However, the most common variety, W2, is acceptable at temperatures in the range of about 80° C. to about 200° C. The more reactive varieties are employed at lower temperatures in the range of about —25° C. to about 50° C. When using the W6 variety, the temperature should be kept below 100° C. to avoid rapid pressure build-up and the possibility of an explosion as a result of this build-up. Using these nickel catalysts, pressures of about 500 p.s.i. to about 3000 p.s.i. are employed, either by autogeneous build-up or by hydrogen pressure. Raney cobalt is even more effective than Raney nickel in the production of the desired tris(2-aminoethyl)amine since the cobalt catalyst inhibits the cyclization caused by an imine attacking a nitrile group in the same molecule. Raney cobalt is employed at temperatures in the range of about —25 to about 200° C. and pressures from about 500 p.s.i. to about 3500 p.s.i. Rhodium can also be employed in the present invention. It allows the reaction to proceed at low pressures and temperatures. A 10 to 20% ratio of 5% rhodium-on-alumina at 15° to 30° C. and 15 p.s.i. to 60 p.s.i. in the presence of 10:1 to 100:1 mole ratio of ammonia to nitrilotriacetonitrile gives the desired tris(2-aminoethyl) amine.

Increased yields of the desired end product can be obtained by using an excess of catalyst. In the normal practice of this invention, catalysts are used to the extent of about ½% to about 10% based on the weight of the compound to be hydrogenated. Excess catalyst, present in amounts ranging from 10% to 250%, increase the yield of the tris(2-aminoethyl)amine considerably.

The temperature at which the process of the present invention is run will depend upon the catalyst and pressure employed. Using Raney nickel or Raney cobalt at the preferred pressures for these catalysts, from about 500 to about 3000 p.s.i., the temperature should be in the range from about —25° C. to about 200° C. Temperatures in excess of 100° C. should not be used for the most active variety of Raney nickel, W6. When rhodium-on-alumina is used as the catalyst at pressures in the range from about 15 to about 2000 p.s.i., the temperature should be in the range from about 10° C. to about 150° C.

The following examples are provided to further illustrate the present invention:

EXAMPLE 1

26.8 gm. (0.2 moles) of nitrilotriacetonitrile, 58 gm. (4 moles) of ammonia and 2.64 gm. of Raney nickel (W3) are charged into an unlined stainless steel autoclave. Hydrogen is introduced to give a total pressure of 1700 p.s.i. Then the charge is raised to the reaction temperature between 125° C. and 140° C. and agitated for 2 hours. The autoclave is cooled in liquid nitrogen to a temperature of about −45° C. The contents are filtered and the ammonia is evaporated off leaving a liquid which boils at 103° C. Upon redistillation the obtained tris(2-aminoethyl)amine boils at 96–99° C.

EXAMPLE 2

26.8 gm. of nitrilotriacetonitrile, 35 gm. (2 moles) of ammonia and 5 gm. of Raney cobalt are charged into an unlined stainless steel autoclave. Hydrogen is introduced to give a total pressure of 3000 p.s.i. and the charge is raised to the reaction temperature between 95 and 105° C. The autoclave is agitated for 2 hours and then cooled in liquid nitrogen to −45° C. The contents are filtered and the ammonia is evaporated off. The remaining liquid is redistilled to give the desired tris(2-aminoethyl)amine.

EXAMPLE 3

26.8 gms. of nitrilotriacetonitrile is dissolved in 1020 cc. of 10% ethanolic ammonia (6.0 moles). 12 gm. of 5% rhodium-on-alumina is added and the mixture is hydrogenated in a Parr shaker under 35 p.s.i. Uptake of 1.2 moles of hydrogen is completed in less than 2 hours. The solution is filtered and the solvent is distilled off, leaving the desired tris(2-aminoethyl)amine.

What is claimed is:

1. The process for the preparation of tris (2-aminoethyl)amine which comprises reacting nitrilotriacetonitrile with hydrogen in the presence of ammonia, wherein said ammonia is present in amount from about 10 to about 100 moles of ammonia per mole of nitrilotriacetonitrile, and a catalyst selected from the group consisting of Raney nickel, Raney cobalt and rhodium at a temperature in the range from about −25° C. to about 200° C.

2. The process of claim 1 wherein the catalyst employed is Raney nickel.

3. The process of claim 1 wherein the catalyst is Raney cobalt.

4. The process of claim 1 wherein the catalyst employed is rhodium.

5. The process of claim 1 wherein the catalyst is present in an amount in the range from about 0.05 to about 250% based on the weight of the nitrilotriacetonitrile to be reacted.

References Cited

UNITED STATES PATENTS 2,647,146  7/1953  Arthur _____ 260—583K

FOREIGN PATENTS 544,655  8/1957  Canada _____ 260—583K
711,654  7/1954  Great Britain _____ 260—583I
962,235  7/1954  Great Britain _____ 260—583K CHARLES B. PARKER, Primary Examiner R. L. RAYMOND, Assistant Examiner

Disclaimer and Dedication 3,565,957.—*Stanley B. Mirviss*, Stamford, Conn., and *Donald J. Martin*, Irvington, and *Edward D. Weil*, Yonkers, N.Y. HYDROGENATION OF NITRILOTRIACETONITRILE. Patent dated Feb. 23, 1971. Disclaimer and Dedication filed Mar. 3, 1980, by the assignee, *Stauffer Chemical Company*.

Hereby disclaims and dedicates to the Public the entire remaining term of said patent.

[*Official Gazette June 10, 1980.*]